US012449040B2

(12) United States Patent
Imura et al.

(10) Patent No.: US 12,449,040 B2
(45) Date of Patent: Oct. 21, 2025

(54) SLIDING COMPONENT

(71) Applicant: EAGLE INDUSTRY CO., LTD., Tokyo (JP)

(72) Inventors: Tadatsugu Imura, Tokyo (JP); Ayano Tanishima, Tokyo (JP); Iwa Ou, Tokyo (JP); Shogo Fukuda, Tokyo (JP); Kenta Uchida, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 128 days.

(21) Appl. No.: 17/923,565

(22) PCT Filed: Apr. 28, 2021

(86) PCT No.: PCT/JP2021/016916
§ 371 (c)(1),
(2) Date: Nov. 4, 2022

(87) PCT Pub. No.: WO2021/230081
PCT Pub. Date: Nov. 18, 2021

(65) Prior Publication Data
US 2023/0184288 A1    Jun. 15, 2023

(30) Foreign Application Priority Data
May 11, 2020  (JP) .................... 2020-083388

(51) Int. Cl.
*F16J 15/34*  (2006.01)
(52) U.S. Cl.
CPC ........... *F16J 15/34* (2013.01); *F16J 15/3412* (2013.01)

(58) Field of Classification Search
CPC ............................. F16J 15/34; F16J 15/3412
See application file for complete search history.

(56) References Cited

U.S. PATENT DOCUMENTS 3,383,116 A   5/1968  Carter .......................... 277/96
3,527,465 A   9/1970  Guinard
(Continued)

FOREIGN PATENT DOCUMENTS

CN   1245552   2/2000   ............... F16J 15/34
CN   2460801   11/2001  ............... F16J 15/40
(Continued)

OTHER PUBLICATIONS

Official Action issued in related U.S. Appl. No. 17/913,153, dated Dec. 21, 2023, 8 pages.

*Primary Examiner* — Vishal A Patel
(74) *Attorney, Agent, or Firm* — HAYES SOLOWAY P.C.

(57) ABSTRACT

An annular sliding component disposed at a relatively rotating position of a rotating machine and sliding relative to the other sliding component has a sliding surface provided with a dynamic pressure generation groove which includes a communication portion communicating with an external space and a dead-end portion on a relative rotation downstream of the communication portion. The sliding component includes a guide configured to guide a fluid existing in the external space on an upstream side of the communication portion in a guide direction different from a direction in which a peripheral surface of the sliding component formed on the downstream side of the communication portion and facing toward a side of the external space extends.

3 Claims, 10 Drawing Sheets

(56) References Cited

U.S. PATENT DOCUMENTS

| | | | |
|---|---|---|---|
| 3,675,935 A | 7/1972 | Ludwig | F16J 15/342 |
| 3,704,019 A | 11/1972 | McHugh | 277/400 |
| 3,782,737 A | 1/1974 | Ludwig et al. | 277/27 |
| 4,056,478 A | 11/1977 | Capelli | C10M 5/00 |
| 4,071,253 A | 1/1978 | Heinen et al. | 277/3 |
| 4,523,764 A | 6/1985 | Albers et al. | 277/3 |
| 4,889,348 A | 12/1989 | Amundson | 277/306 |
| 5,071,141 A | 12/1991 | Lai et al. | |
| 5,092,612 A | 3/1992 | Victor et al. | 277/96.1 |
| 5,174,584 A | 12/1992 | Lahrman | 277/400 |
| 5,180,173 A | 1/1993 | Kimura et al. | |
| 5,224,714 A | 7/1993 | Kimura | 277/400 |
| 5,447,316 A | 9/1995 | Matsui | 277/400 |
| 5,556,111 A | 9/1996 | Sedy | 277/400 |
| 5,558,341 A | 9/1996 | McNickle | 277/400 |
| 5,769,604 A | 6/1998 | Gardner et al. | 415/170.1 |
| 5,834,094 A | 11/1998 | Etsion et al. | 428/156 |
| 5,947,481 A | 9/1999 | Young | 277/400 |
| 5,952,080 A | 9/1999 | Etsion et al. | 428/156 |
| 6,002,100 A | 12/1999 | Etsion | 219/121.71 |
| 6,046,430 A | 4/2000 | Etsion | 219/121.71 |
| 6,135,458 A | 10/2000 | Fuse | 277/401 |
| 6,152,452 A | 11/2000 | Wang | 277/400 |
| 6,213,473 B1* | 4/2001 | Lebeck | F16J 15/342 |
| | | | 277/408 |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 | 7/2010 | Roberts-Haritonov | 277/401 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,667 B2 | 2/2017 | Takahashi et al. | F16J 15/342 |
| 9,772,037 B2 | 9/2017 | Itadani et al. | F16J 15/3412 |
| 9,784,372 B2 | 10/2017 | Iguchi | F16J 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 | 11/2018 | Hosoe et al. | F16J 15/164 |
| 10,337,620 B2 | 7/2019 | Tokunaga et al. | F16J 15/342 |
| 10,443,737 B2 | 10/2019 | Itadani | F16J 15/342 |
| 10,495,228 B2 | 12/2019 | Itadani | F16J 15/342 |
| 10,865,883 B2 | 12/2020 | Seki et al. | F16J 15/3404 |
| 11,248,706 B2 | 2/2022 | Imura | F16C 33/74 |
| 11,320,052 B2 | 5/2022 | Imura et al. | F16J 15/34 |
| 11,530,749 B2 | 12/2022 | Kimura et al. | F16J 15/164 |
| 11,603,934 B2 | 3/2023 | Imura | F16J 15/3412 |
| 2002/0014743 A1 | 2/2002 | Zheng | 277/358 |
| 2002/0093141 A1 | 7/2002 | Wang | F16J 15/34 |
| 2002/0158416 A1 | 10/2002 | Hosanna | F16J 15/3404 |
| 2004/0080112 A1 | 4/2004 | Tejima | F16J 15/3436 |
| 2005/0212217 A1 | 9/2005 | Tejima | 277/399 |
| 2005/0263963 A1* | 12/2005 | Lai | F16J 15/3408 |
| | | | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 | 12/2007 | Yanagisawa et al. | 277/352 |
| 2008/0050260 A1 | 2/2008 | Iwanami et al. | 418/55.6 |
| 2008/0100001 A1 | 5/2008 | Flaherty | |
| 2009/0200749 A1 | 8/2009 | Teshima | F16J 15/3484 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrufer | C10M 103/02 |
| 2013/0209011 A1 | 8/2013 | Tokunaga | |
| 2013/0323105 A1 | 12/2013 | Chao et al. | F14C 29/028 |
| 2014/0159314 A1 | 6/2014 | Hosoe | F16J 15/34 |
| 2014/0197600 A1 | 7/2014 | Hosoe | F16J 15/342 |
| 2014/0217676 A1 | 8/2014 | Hosoe et al. | 277/350 |
| 2014/0319776 A1 | 10/2014 | Theike et al. | |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0184752 A1* | 7/2015 | Itadani | F16J 15/3412 |
| | | | 277/400 |
| 2015/0345642 A1 | 12/2015 | Haas | F16J 15/3496 |
| 2015/0377297 A1 | 12/2015 | Tokunaga et al. | F16C 33/748 |
| 2016/0033045 A1 | 2/2016 | Itadani et al. | F16J 15/3412 |
| 2016/0097457 A1 | 4/2016 | Sun et al. | F16J 15/3412 |
| 2017/0146014 A1 | 5/2017 | Ohta et al. | F04C 29/0021 |
| 2017/0241549 A1 | 8/2017 | Itadani | F16J 15/3412 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 | 1/2018 | Hosoe et al. | F16J 15/164 |
| 2018/0051809 A1 | 2/2018 | Yoshida | F16J 15/3412 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |
| 2018/0292010 A1 | 10/2018 | Ohya et al. | F16J 15/34 |
| 2018/0299015 A1 | 10/2018 | Itadani | F16J 15/3448 |
| 2019/0169988 A1 | 6/2019 | Tokunaga et al. | F10C 19/12 |
| 2019/0170257 A1 | 6/2019 | Hosoe et al. | F16J 15/3412 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0224768 A1 | 7/2020 | Imura | F16J 15/3412 |
| 2020/0240470 A1 | 7/2020 | Sorgenti | F16J 15/3212 |
| 2020/0332901 A1 | 10/2020 | Imura | F16J 15/3412 |
| 2021/0041026 A1 | 2/2021 | Imura | F16J 15/3424 |
| 2021/0048062 A1 | 2/2021 | Masumi et al. | F16C 17/102 |
| 2021/0048106 A1 | 2/2021 | Imura et al. | F16J 15/3412 |
| 2021/0080009 A1 | 3/2021 | Kimura et al. | F16J 15/3412 |
| 2021/0116030 A1 | 4/2021 | Kimura et al. | F16J 15/182 |
| 2021/0164571 A1 | 6/2021 | Kimura | F16J 15/3412 |
| 2021/0364034 A1 | 11/2021 | Okada | F16J 15/342 |
| 2022/0056949 A1 | 2/2022 | Ikeda et al. | F16C 17/04 |
| 2022/0099190 A1* | 3/2022 | Ou | F16C 33/107 |
| 2022/0128088 A1 | 4/2022 | Suzuki | F16C 33/107 |
| 2023/0027772 A1 | 1/2023 | Suzuki et al. | F16C 17/02 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 106029294 | 10/2016 | B23K 26/364 |
| CN | 205877184 | 1/2017 | F16J 15/16 |
| CN | 205877198 | 1/2017 | F16J 15/34 |
| CN | 106439023 | 2/2017 | F16J 15/16 |
| CN | 107489770 | 12/2017 | F16J 15/34 |
| CN | 206802309 | 12/2017 | F16J 15/40 |
| CN | 107906206 | 4/2018 | F16J 15/34 |
| CN | 207740464 | 8/2018 | F16J 15/34 |
| CN | 109237042 | 1/2019 | F16J 15/34 |
| CN | 110770456 | 2/2020 | F16C 33/12 |
| CN | 110925426 | 3/2020 | F16J 15/16 |
| CN | 111656065 | 9/2020 | F16J 15/34 |

(56) References Cited

FOREIGN PATENT DOCUMENTS

| | | | | |
|---|---|---|---|---|
| DE | 3223703 | 6/1982 | ............... | F16J 15/34 |
| DE | 102008038396 | 2/2010 | | |
| EP | 0369295 | 11/1988 | ............... | F16J 15/34 |
| EP | 0518681 | 12/1992 | ............. | G11B 15/60 |
| EP | 0637706 | 8/1993 | ............... | F16J 15/34 |
| EP | 2138225 | 12/2009 | ............... | B01J 13/20 |
| EP | 2754931 | 7/2014 | ............... | F16J 15/34 |
| EP | 3112078 | 1/2017 | ........... | B23K 26/364 |
| EP | 3196516 | 7/2017 | ............... | F16J 15/34 |
| EP | 3217049 | 9/2017 | ............... | F16J 15/34 |
| EP | 3273117 | 1/2018 | ............... | F16J 15/18 |
| EP | 3396186 | 10/2018 | ............... | F16C 33/10 |
| EP | 3575621 | 12/2019 | ............... | F16C 33/10 |
| EP | 3575643 | 12/2019 | ............... | F16J 15/34 |
| EP | 3650722 | 5/2020 | ............... | F16C 33/12 |
| EP | 3653913 | 5/2020 | ............... | F16J 15/34 |
| FR | 2342440 | 9/1997 | ............... | F16J 15/34 |
| GB | 1509482 | 5/1978 | ............... | F16C 33/10 |
| GB | 2263952 | 8/1993 | ............... | F16J 15/34 |
| JP | S51-034974 | 3/1976 | | |
| JP | S52-143571 | 10/1977 | ............... | F16J 15/26 |
| JP | 57163770 | 10/1982 | ........... | F16J 15/3412 |
| JP | S59-195253 | 12/1984 | ............... | F16J 15/34 |
| JP | S59-195254 | 12/1984 | ............... | F16J 15/34 |
| JP | S61-8402 | 1/1986 | ............... | F01C 1/01 |
| JP | S63-134883 | 6/1988 | ............... | F04C 18/02 |
| JP | S63-190975 | 8/1988 | ............... | F16J 15/34 |
| JP | H02-16381 | 1/1990 | ............... | F04C 18/02 |
| JP | H02-236067 | 9/1990 | ............... | F16J 15/34 |
| JP | H02-136863 | 11/1990 | ............... | F16J 15/34 |
| JP | H04-50559 | 2/1992 | ............... | F16J 15/34 |
| JP | H04-337165 | 11/1992 | ............... | F16J 15/34 |
| JP | H04-362289 | 12/1992 | ............... | F04C 18/02 |
| JP | H05-60247 | 3/1993 | ............... | F16J 15/34 |
| JP | H05-296248 | 11/1993 | | |
| JP | H05-90049 | 12/1993 | ............... | F16J 15/34 |
| JP | H06-17941 | 1/1994 | ............... | F16J 15/34 |
| JP | H06-117547 | 4/1994 | ............... | F16J 15/34 |
| JP | H06-174107 | 6/1994 | ............... | F16J 15/34 |
| JP | H06-323442 | 11/1994 | ............... | F16J 15/34 |
| JP | H06-105105 | 12/1994 | ............... | F16J 15/34 |
| JP | H07-43038 | 5/1995 | ............... | F16J 15/34 |
| JP | 9-89119 | 3/1997 | ............... | F16J 15/34 |
| JP | 9-292034 | 11/1997 | ............... | F16J 15/34 |
| JP | H10-281299 | 10/1998 | ............... | F16J 15/34 |
| JP | H10-292867 | 11/1998 | | |
| JP | H10-339286 | 12/1998 | ............... | F04C 18/02 |
| JP | H11-132163 | 5/1999 | ............... | F04C 18/02 |
| JP | H11-287329 | 10/1999 | ............... | F16J 15/34 |
| JP | 3066367 | 5/2000 | ............... | F16J 15/34 |
| JP | 2001-12458 | 1/2001 | ............... | F16C 17/10 |
| JP | 2003-343730 | 12/2003 | ............... | F16J 15/22 |
| JP | 2005-155894 | 6/2005 | ............... | F16C 17/04 |
| JP | 2005-180652 | 7/2005 | ............... | F16J 15/34 |
| JP | 2005-315391 | 11/2005 | | |
| JP | 2005-337503 | 12/2005 | ............... | F16J 15/34 |
| JP | 2006-9614 | 1/2006 | ............... | F04C 18/08 |
| JP | 2006-77899 | 3/2006 | ............... | F16J 15/34 |
| JP | 2006-90524 | 4/2006 | ............... | F16C 17/02 |
| JP | 2006-183702 | 7/2006 | ............... | F16C 17/04 |
| JP | 2006-316677 | 11/2006 | ............... | F04C 18/02 |
| JP | 2007-162045 | 6/2007 | | |
| JP | 2008-51018 | 3/2008 | ............... | F04C 18/02 |
| JP | 2008-51030 | 3/2008 | ............... | F04C 18/02 |
| JP | 2008-106940 | 5/2008 | ............... | F16J 15/34 |
| JP | 2011-74931 | 4/2011 | ............... | F16J 15/34 |
| JP | 2011-185292 | 9/2011 | ............... | F16J 15/34 |
| JP | 2012-2295 | 1/2012 | ............... | F16J 15/34 |
| JP | 2012-062534 | 3/2012 | | |
| JP | 2012-82794 | 4/2012 | ............... | F04C 18/02 |
| JP | 2012-122135 | 6/2012 | ............. | C25D 15/02 |
| JP | 2013-167216 | 8/2013 | ............... | F04C 18/02 |
| JP | 2013-213545 | 10/2013 | ............... | F16C 32/06 |
| JP | 2014-529052 | 10/2014 | | |
| JP | 2015-063647 | 4/2015 | | |
| JP | 2015-68330 | 4/2015 | ............... | F04C 29/00 |
| JP | 5693599 | 4/2015 | | |
| JP | 2015-183631 | 10/2015 | ............... | F04C 2/10 |
| JP | 2016-61208 | 4/2016 | ............... | F04C 18/02 |
| JP | 2016-80090 | 5/2016 | ............... | F16J 15/34 |
| JP | 5960145 | 7/2016 | ............... | F16J 15/34 |
| WO | WO2006051702 | 5/2006 | ............... | F16J 15/34 |
| WO | WO2011115073 | 9/2011 | ............... | F16J 15/34 |
| WO | WO2012046749 | 4/2012 | ............... | F16J 15/34 |
| WO | WO2013035503 | 3/2013 | ............... | F16J 15/34 |
| WO | WO2013053411 | 4/2013 | | |
| WO | WO2014061544 | 4/2014 | | |
| WO | WO2014148316 | 9/2014 | ............... | F16J 15/34 |
| WO | WO2014148317 | 9/2014 | ............... | F16J 15/34 |
| WO | WO2014174725 | 10/2014 | ............... | F16J 15/34 |
| WO | WO2015111707 | 7/2015 | ............... | F16J 15/18 |
| WO | WO2016035860 | 3/2016 | ............... | F16J 15/34 |
| WO | WO2016167262 | 10/2016 | ............... | F16J 15/34 |
| WO | WO2016186015 | 11/2016 | ............... | F16J 15/34 |
| WO | WO2016186019 | 11/2016 | ............... | F16J 15/34 |
| WO | WO2016186020 | 11/2016 | ............... | F16J 15/34 |
| WO | WO2016203878 | 12/2016 | ............... | F16J 15/34 |
| WO | WO2017002774 | 1/2017 | ............... | F16J 15/34 |
| WO | WO2017061406 | 4/2017 | ............... | F16J 15/34 |
| WO | WO2018025629 | 2/2018 | ............... | F02B 55/02 |
| WO | WO2018092742 | 5/2018 | ............... | F16J 15/34 |
| WO | WO2018105505 | 6/2018 | ............... | F16J 33/12 |
| WO | WO2018139231 | 8/2018 | ............... | F16J 15/34 |
| WO | WO2019013233 | 1/2019 | ............... | F16J 15/34 |
| WO | WO2019221227 | 11/2019 | ............... | F16J 15/18 |
| WO | WO2019221231 | 11/2019 | ............... | F16J 15/18 |
| WO | WO2020129846 | 6/2020 | ............... | F16C 17/04 |
| WO | WO2021125201 | 6/2021 | ............... | F16J 15/18 |

\* cited by examiner

SLIDING COMPONENT

TECHNICAL FIELD

The present invention relates to sliding components that rotate relative to each other and are used for, for example, a shaft sealing device shaft-sealing a rotary shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device that prevents a leakage of a sealing target fluid, for example, a mechanical seal includes a pair of annular sliding components rotating relative to each other so that sliding surfaces slide on each other. In such a mechanical seal, there has been a recent demand to reduce the energy lost caused by sliding for environmental measures and the like.

For example, in a mechanical seal shown in Patent Citation 1, a dynamic pressure generation mechanism is provided on a sliding surface of one sliding component. This dynamic pressure generation mechanism includes a conduction groove which communicates with an outer space in which a sealing target fluid exists and extends in a radial direction and a dynamic pressure generation groove which extends from the conduction groove in a circumferential direction and has a closed terminating end and the conduction groove is formed to be deeper than the dynamic pressure generation groove. Accordingly, a sealing target fluid is introduced from the outer space into the dynamic pressure generation groove through the conduction groove, the sealing target fluid moves toward the terminating end of the dynamic pressure generation groove, a positive pressure is generated at the terminating end of the dynamic pressure generation groove to separate the sliding surfaces from each other, and the sealing target fluid is interposed between the sliding surfaces during the relative rotation of the sliding component. As a result, lubricity is improved.

CITATION LIST

Patent Literature

Patent Citation 1: WO 2012/046749 A (Page 17, FIG. 1)

SUMMARY OF INVENTION

Technical Problem

In Patent Citation 1, the dynamic pressure generation groove is provided to improve lubricity. However, the contamination mixed with the sealing target fluid during the relative rotation of the sliding component is also introduced from the conduction groove and then is introduced into the dynamic pressure generation groove so that the contamination finally enters between the sliding surfaces. As a result, there is a risk that the contamination is caught between the sliding surfaces and causes abrasive wear.

The present invention has been made in view of such problems and an object thereof is to provide a sliding component capable of suppressing a contamination from entering a dynamic pressure generation groove.

Solution to Problem

In order to solve the above-described problems, a sliding component of the present invention is a sliding component formed in an annular shape and disposed at a relatively rotating position of a rotating machine and sliding relative to a different component, wherein a sliding surface of the sliding component is provided with a dynamic pressure generation groove which includes a communication portion communicating with an external space and a dead-end portion on a downstream side due to relative rotation in relation to the communication portion, and wherein the sliding component comprises a guide means configured to guide a fluid existing in the external space on an upstream side of the communication portion in a guide direction different from a direction in which a peripheral surface of the sliding component formed on the downstream side of the communication portion and facing toward a side of the external space extends. According to the aforesaid feature of the present invention, when the sliding components rotate relative to each other, the fluid on the relative rotation upstream of the communication portion flows toward the relative rotation downstream of the communication portion while not being directed toward the communication portion by the guide means. At the communication portion, a fluid which is slower than the flow flows and the flow rate is also small. Since the contamination having large specific gravity flows along the flow having a relatively high flow velocity, the contamination flows to the relative rotation downstream of the communication portion and does not easily reach the communication portion. In this way, it is possible to suppress the contamination from entering the dynamic pressure generation groove.

It may be preferable that the guide means is a peripheral surface portion which is radially shifted on the side of the external space from the peripheral surface. Please note that the peripheral surface portion might be also called as a relative rotation upstream peripheral surface, and the peripheral surface might be also called as a relative rotation downstream peripheral surface. According to this preferable configuration, a step portion having a radial step is formed by the relative rotation upstream peripheral surface and the relative rotation downstream peripheral surface and the fluid on the relative rotation upstream of the communication portion is guided toward a direction different from the relative rotation downstream peripheral surface to suppress the contamination from entering the dynamic pressure generation groove.

It may be preferable that the peripheral surface portion extends to a position overlapping with the communication portion in a view from a radial direction. According to this preferable configuration, it is possible to reliably suppress the contamination from entering the dynamic pressure generation groove.

It may be preferable that the sliding component further includes an inclined surface which is inclined to be deeper from the communication portion toward the external space. According to this preferable configuration, since the contamination having a large specific gravity is separated from the flow of the fluid while contacting the inclined surface when the fluid in the external space is introduced into the communication portion, it is possible to suppress the contamination from entering the dynamic pressure generation groove.

It may be preferable that the guide means is a concave portion which is provided in the sliding surface and opens to the external space. According to this preferable configuration, since the concave portion can guide the fluid in the external space in a direction different from the relative rotation downstream peripheral surface of the communication portion, the guide means can have a simple structure.

It may be preferable configuration a side wall of the concave portion is formed as a curved surface when viewed from an axial direction. According to this preferable configuration, the fluid in the concave portion is smoothly guided along the side wall.

It may be preferable that the side wall of the concave portion includes an inclined surface which is inclined with respect to a circumferential direction so as to radially extend in a direction away from an end portion on the side of the external space toward the side of the communication portion. According to this preferable configuration, the fluid in the concave portion is smoothly guided along the inclined surface.

DESCRIPTION OF EMBODIMENTS

Figure 1:
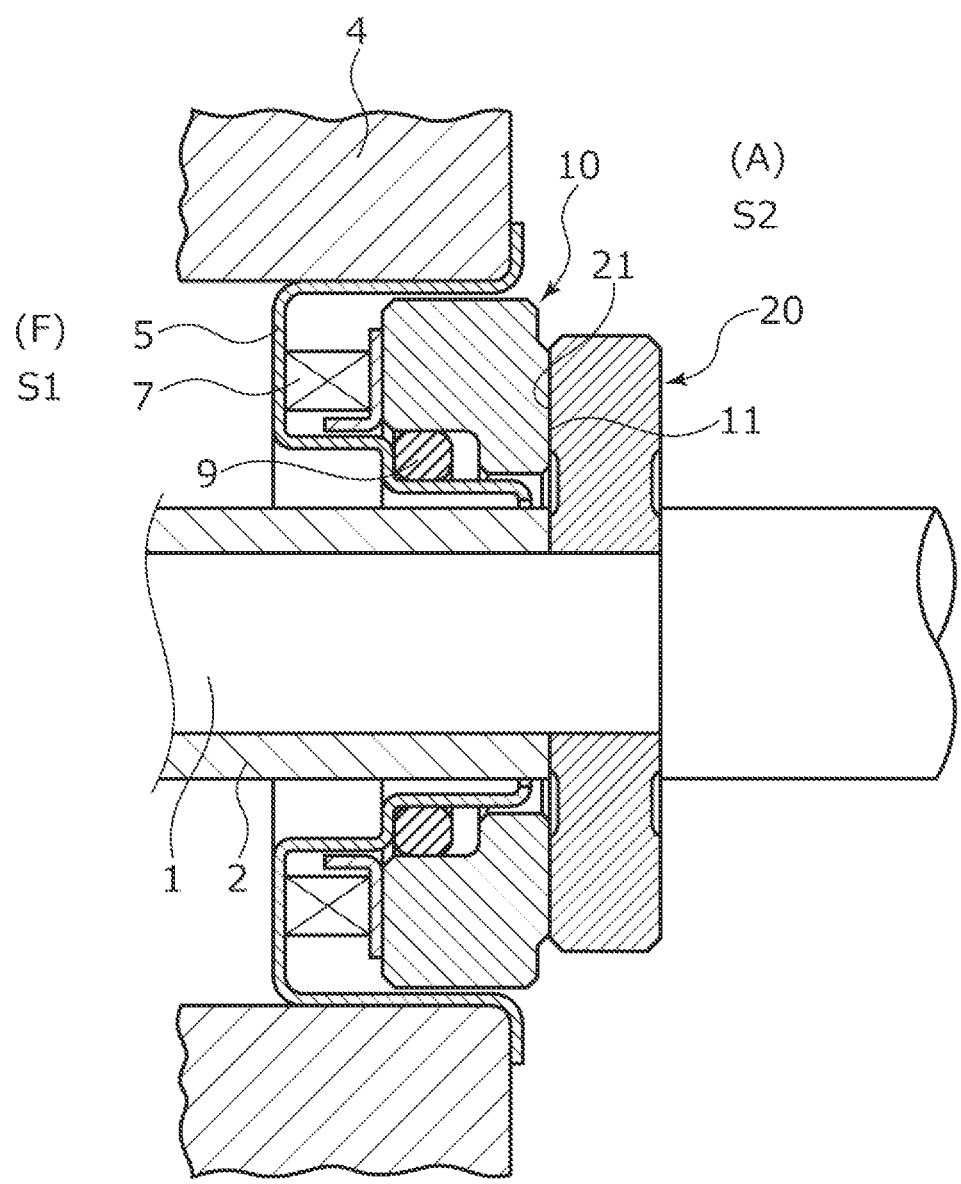
FIG. 1 is a longitudinal sectional view showing an example of a sliding component (e.g., forming a mechanical seal) according to a first embodiment of the present invention.

Modes for carrying out a sliding component according to the present invention will be described below on the basis of the embodiments.

First Embodiment

A sliding component according to a first embodiment of the present invention will be described with reference to FIGS. 1 to 5. Additionally, in this embodiment, an embodiment in which a sliding component is a mechanical seal will be described as an example. Further, a description will be made such that a sealing target fluid F exists in an inner space S1 corresponding to an external space on an inner radial side of the mechanical seal and an atmosphere A exists in an outer space S2 corresponding to an external space on an outer radial side thereof. Further, for convenience of description, in the drawings, dots may be added to a groove and the like formed on a sliding surface.

A mechanical seal for general industrial machines shown in FIG. 1 is of an outside type that seals the sealing target fluid F tending to leak from an inner radial side to an outer radial side of a sliding surface. Additionally, in this embodiment, an embodiment in which the sealing target fluid F is a high-pressure liquid and the atmosphere A is a gas having a pressure lower than that of the sealing target fluid F is illustrated.

The mechanical seal mainly includes a rotating seal ring 20 which is the other annular sliding component provided in a rotary shaft 1 through a sleeve 2 to be rotatable together with the rotary shaft 1, a casing 5 which is fixed to a housing 4 of an attachment target device, an annular stationary seal ring 10 which is a sliding component provided not to be rotatable with respect to the casing 5 and to be movable in the axial direction, a secondary seal 9 which seals a gap between the casing 5 and the stationary seal ring 10, and urging means 7 disposed between the casing 5 and the stationary seal ring 10 and when the urging means 7 urges the stationary seal ring 10 in the axial direction, a sliding surface 11 of the stationary seal ring 10 and a sliding surface 21 of the rotating seal ring 20 slide closely with each other. Additionally, the sliding surface 21 of the rotating seal ring 20 is formed as a flat surface and this flat surface is not provided with a concave portion such as a groove.

The stationary seal ring 10 and the rotating seal ring 20 are typically formed of SiC (as an example of hard material) or a combination of SiC and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., a coating material), a composite material, and the like can also be applied.

Figure 2:
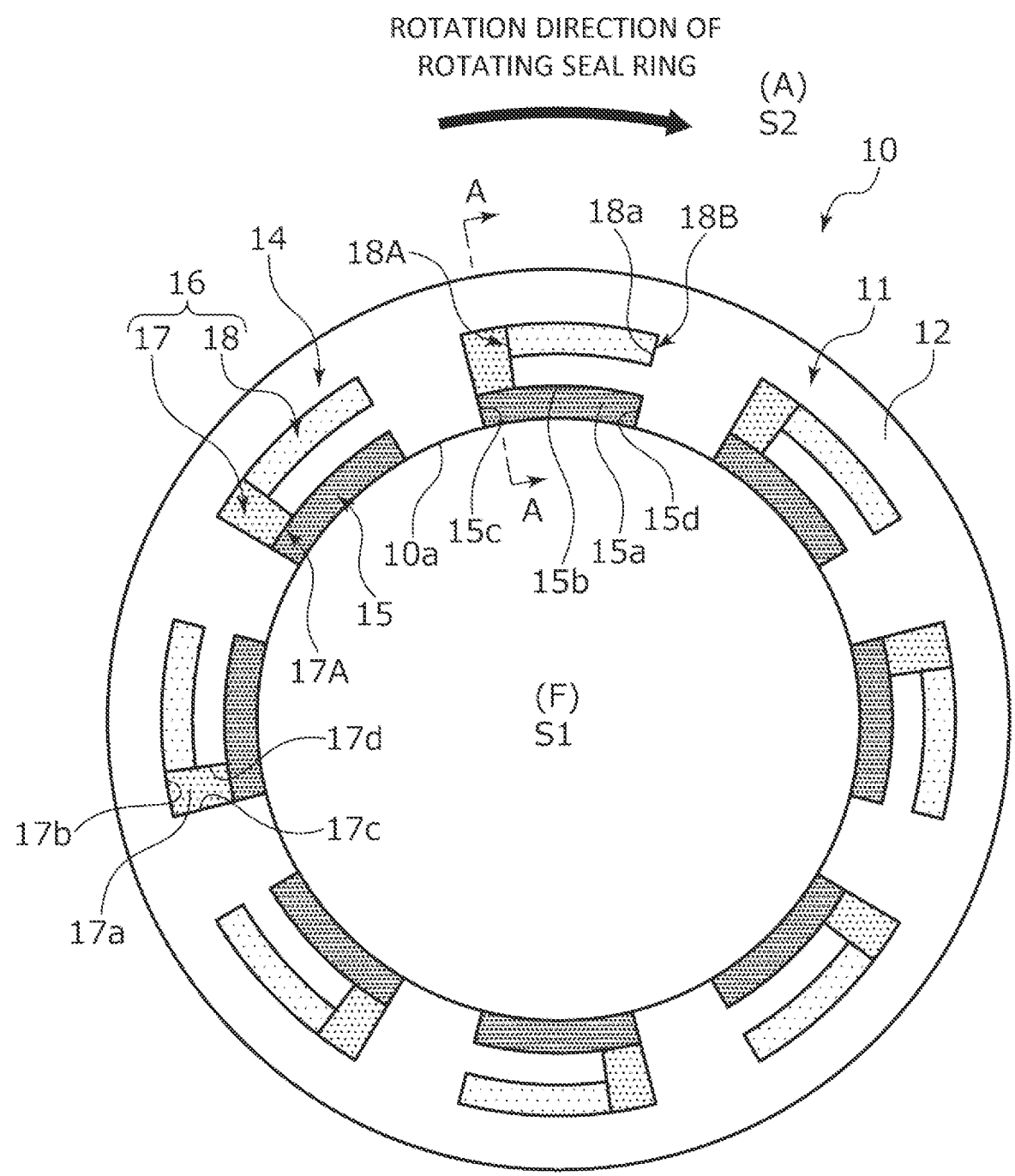
FIG. 2 is a view of a sliding surface of a stationary seal ring from an axial direction in the first embodiment.

As shown in FIG. 2, the rotating seal ring 20 slides relative to the stationary seal ring 10 clockwise as indicated by the arrow. In the sliding surface 11 of the stationary seal ring 10, a plurality of (in the first embodiment, eight) groove mechanisms 14 are evenly provided in the circumferential direction on the inner radial side. Additionally, a portion other than the groove mechanism 14 of the sliding surface 11 is formed as a land 12 of which an upper portion is a flat surface. Further, a positive pressure generation mechanism such as a dimple may be formed on the outer radial side of the sliding surface 11.

Next, the outline of the groove mechanism 14 will be described with reference to FIGS. 2 and 3. In addition, hereinafter, for convenience of description, a deep groove portion 17 is shown to be shallower than the actual one.

Figure 3:
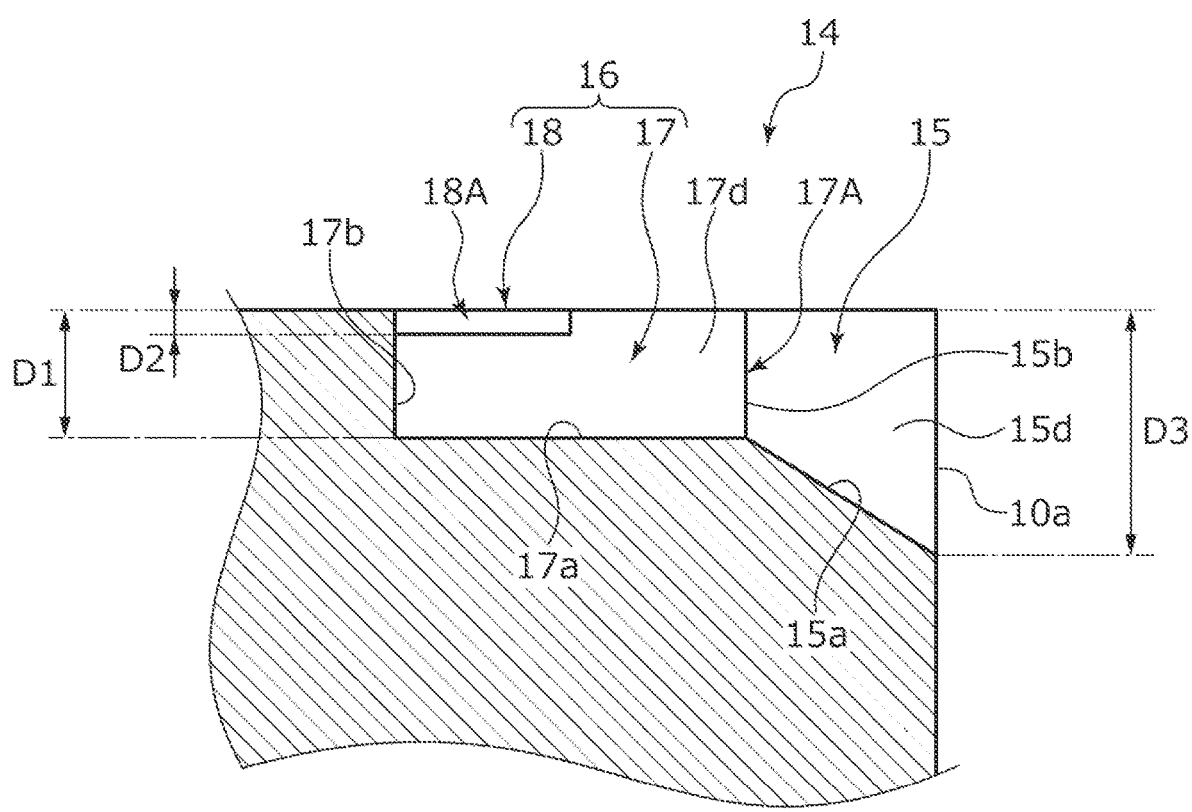
FIG. 3 is a cross-sectional view of A-A of FIG. 2.

As shown in FIGS. 2 and 3, the groove mechanism 14 includes a concave groove 15 which communicates with the inner space S1 and extends in the circumferential direction and a dynamic pressure generation groove 16 which is provided on the outer radial side of the concave groove 15 and the dynamic pressure generation groove 16 communicates with the concave groove 15.

The dynamic pressure generation groove 16 includes a deep groove portion 17 which extends from the relative rotation upstream end portion of the concave groove 15 toward the outer radial direction and a shallow groove portion 18 which extends in the circumferential direction from the outer radial end portion of the deep groove portion 17 toward the relative rotation downstream. In addition, although it will be described later, the deep groove portion 17 is a portion which conducts the sealing target fluid F to the shallow groove portion 18 and the shallow groove portion 18 is a portion which substantially generates a dynamic pressure.

The inner radial end portion of the deep groove portion 17 is a communication portion 17A which communicates with the inner space S1 through the concave groove 15. Specifically, the deep groove portion 17 includes a bottom surface 17a which is flat along the radial direction and is parallel to the flat surface of the land 12, a wall portion 17b which extends perpendicularly from the outer radial end of the bottom surface 17a toward the flat surface of the land 12, and side surfaces 17c and 17d which extend perpendicularly from both side edges of the bottom surface 17a in the circumferential direction toward the flat surface of the land 12.

This deep groove portion 17 has a constant depth D1 in the radial direction.

The shallow groove portion 18 extends in the circumferential direction in parallel to an edge of an inner peripheral surface 10a of the stationary seal ring 10 when viewed from the axial direction, a relative rotation upstream starting end portion 18A communicates with the deep groove portion 17, and a relative rotation downstream terminating end portion 18B is blocked by a wall portion 18a. That is, the terminating end portion 18B of the shallow groove portion 18 functions as a blocking portion.

This shallow groove portion 18 has a constant depth D2 in the circumferential direction and the depth D2 is shallower than the depth D1 (i.e., D1>D2). In addition, the depth D2 of the shallow groove portion 18 can be freely changed, but preferably the depth D2 may be 1/10 times or less the depth D1.

The concave groove 15 is partitioned by a bottom surface 15a which is an inclined surface inclined to be deeper from the outer radial end portion toward the inner radial end portion, a peripheral surface 15b which perpendicularly extends from the outer edge of the bottom surface 15a excluding the communication portion 17A toward the flat surface of the land 12, and side surfaces 15c and 15d which are formed at both circumferential ends of the bottom surface 15a. That is, the peripheral surface 15b is also the inner peripheral surface 15b of the land 12 that radially partitions the concave groove 15 and the shallow groove portion 18.

The peripheral surface 15b is a curved surface which extends to the relative rotation downstream of the communication portion 17A to have the same diameter as the communication portion 17A. This peripheral surface 15b is disposed on the outer radial side in relation to the inner peripheral surface 10a of the stationary seal ring 10. A step portion having a radial step is formed by the inner peripheral surface 10a and the group of the communication portion 17A and the peripheral surface 15b. Specifically, a crank-shaped step portion is formed by the inner peripheral surface 10a, the side surface 15c, and the group of the communication portion 17A and the peripheral surface 15b when viewed from the axial direction.

Further, in the concave groove 15, the inner radial end, that is, the opening portion communicating with the inner space S1 is the deepest and a depth D3 is deeper than the depth D1 (i.e., D1<D3).

Next, the flow of the sealing target fluid F during the relative rotation of the stationary seal ring 10 and the rotating seal ring 20 will be schematically described with reference to FIGS. 4 and 5. In addition, here, for convenience of description, the amount of contamination C1 contained in the sealing target fluid F is shown to be larger than the actual amount.

First, since the urging means 7 urges the stationary seal ring 10 toward the rotating seal ring 20 in a non-operation state of a general industrial machine when the rotating seal ring 20 does not rotate, the sliding surfaces 11 and 21 are in contact with each other and there is almost no amount of the sealing target fluid F leaking from the gap between the sliding surfaces 11 and 21 to the outer space S2.

Figure 4:
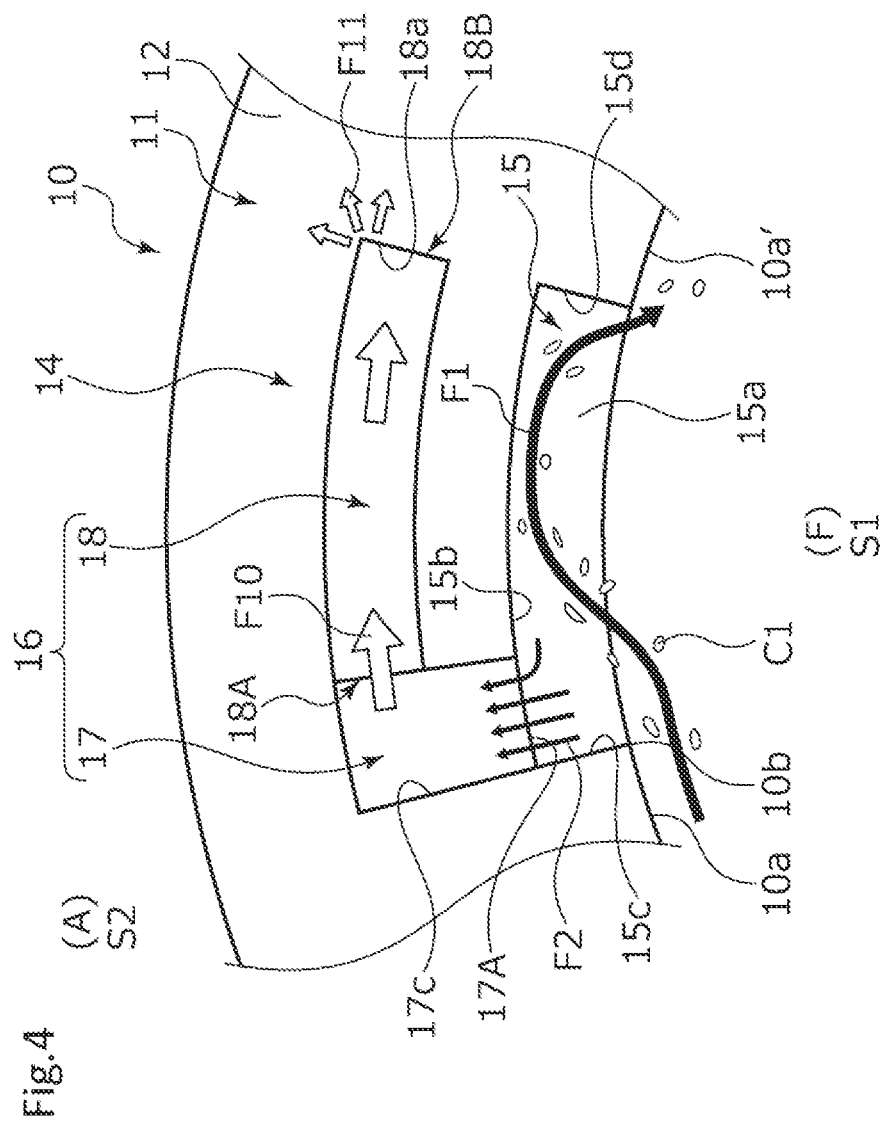
FIG. 4 is a schematic view showing a flow of a sealing target fluid during relative rotation in the first embodiment.

As shown in FIG. 4, when the rotating seal ring 20 rotates relative to the stationary seal ring 10, the sealing target fluid F in the concave groove 15 and the deep groove portion 17 and the shallow groove portion 18 of the dynamic pressure generation groove 16 follows the rotation direction of the rotating seal ring 20 due to the friction with the sliding surface 21.

Specifically, as indicated by the arrow F10, the sealing target fluid F in the shallow groove portion 18 moves from the starting end portion 18A toward the terminating end portion 18B and hence the sealing target fluid F in the deep groove portion 17 flows into the shallow groove portion 18.

The pressure of the sealing target fluid F in the shallow groove portion 18 having moved toward the terminating end portion 18B is increased in the wall portion 18a constituting the terminating end portion 18B of the shallow groove portion 18 and the vicinity thereof. That is, a positive pressure is generated in the wall portion 18a and the vicinity thereof and as indicated by the arrow F11, the sealing target fluid F flows out between the sliding surfaces 11 and 21 and the sliding surfaces 11 and 21 are separated from each other to improve lubricity.

Further, the flow of the sealing target fluid F is also generated in the vicinity of the inner radial side of the sliding surfaces 11 and 21 during the relative rotation between the rotating seal ring 20 and the stationary seal ring 10.

Specifically, the sealing target fluid F of the inner space S1 is largely classified into a flow F1 flowing from the inner peripheral surface 10a of the stationary seal ring 10 located at the relative rotation upstream of the concave groove 15 toward an inner peripheral surface 10a' of the stationary seal ring 10 located at the relative rotation downstream of the concave groove 15 through the concave groove 15 and a flow F2 sucked into the deep groove portion 17.

This flow F1 is a flow generated by a shearing force accompanying the rotation of the sliding surface 21 (see FIG. 1) of the rotating seal ring 20, flows along the inner peripheral surface 10a of the stationary seal ring 10, and flows in a meandering manner in the outer radial direction at the position of the concave groove 15. On the other hand, the flow F2 is a flow sucked from the concave groove 15 into the communication portion 17A due to the flow (see the arrows F10 and F11) of the sealing target fluid F in the shallow groove portion 18 having a smaller volume than the concave groove 15. In this way, the flow F2 is slower than the flow F1.

The flow F1 reaches the peripheral surface 15b over the communication portion 17A from the inner peripheral surface 10a of the stationary seal ring 10 located on the inner radial side in relation to the communication portion 17A and the peripheral surface 15b and flows toward the relative rotation downstream. That is, the inner peripheral surface 10a of the stationary seal ring 10 functions as guide means for guiding the sealing target fluid F in a direction different from the communication portion 17A and the peripheral surface 15b.

Since the contamination C1 having a large specific gravity contained in the sealing target fluid F flows along the flow F1 having a relatively high flow velocity, most of the contamination C1 flows to the peripheral surface 15b on the relative rotation downstream of the communication portion 17A and does not easily reach the communication portion 17A. That is, the contamination C1 having a large specific gravity does not easily enter the dynamic pressure generation groove 16.

Figure 5:
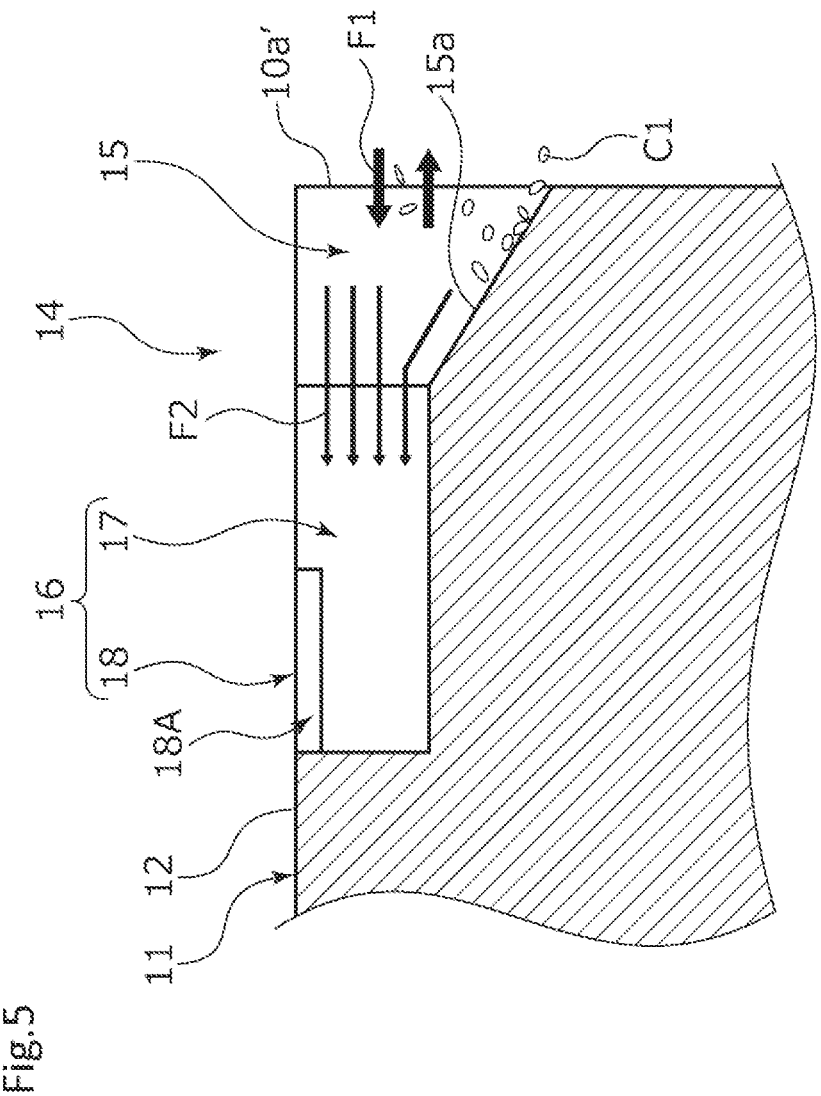
FIG. 5 is a longitudinal sectional view showing the flow of the sealing target fluid during relative rotation in the first embodiment.

Further, as shown in FIG. 5, since the contamination C1 introduced into the concave groove 15 is separated from the flow F1 by contacting the bottom surface 15a of the concave groove 15, the contamination C1 does not easily enter the dynamic pressure generation groove 16.

Further, the relative rotation upstream side surface 15c (see FIG. 4) of the concave groove 15 is provided on the extension line of a relative rotation upstream side surface 17c of the deep groove portion 17. Accordingly, since a relative rotation downstream end portion 10b of the inner peripheral surface 10a of the stationary seal ring 10 can be closer to the communication portion 17A in the circumferential direction, it is possible to form the flow F1 reliably exceeding the communication portion 17A.

Further, since a corner portion formed by the inner peripheral surface 10a of the stationary seal ring 10 and the side surface 15c of the concave groove 15 forms a substantially right angle, the direction of the flow F1 of the sealing target fluid F is largely different from the direction of the flow F2. Since the inertia due to the flow F1 greatly acts on the contamination C1 having a large specific gravity, the contamination does not easily follow the flow F2 and easily follows the flow F1.

As described above, when the rotating seal ring 20 and the stationary seal ring 10 rotate relative to each other, the sealing target fluid F on the relative rotation upstream of the communication portion 17A flows to the peripheral surface 15b extending toward the relative rotation downstream of the communication portion 17A while not being directed toward the communication portion 17A by the inner peripheral surface 10a of the stationary seal ring 10 so that the flow F2 which is slower than the flow F1 flows to the communication portion 17A. Further, the flow rate of the flow F2 is smaller than the flow rate of the flow F1. Since the contamination C1 having large specific gravity flows along the flow F1 having a relatively high flow velocity, the contamination C1 flows to the relative rotation downstream of the communication portion 17A and does not easily reach the communication portion 17A. In this way, since it is possible to suppress the contamination C1 from entering the dynamic pressure generation groove 16, it is possible to prevent the contamination C1 from flowing out between the sliding surfaces 11 and 21 and causing abrasive wear.

Further, a part of the contamination (not shown) having a smaller specific gravity than the contamination C1 enters the dynamic pressure generation groove 16 along the flow F2, but most of such contaminations having a small specific gravity are fragile or soft. Accordingly, there is no possibility of abrasive wear between the sliding surfaces 11 and 21.

Additionally, in the first embodiment, an embodiment in which the relative rotation downstream end portion 10b of the inner peripheral surface 10a of the stationary seal ring 10 is provided on the extension line of the side surface 17c of the deep groove portion 17 has been illustrated, but the present invention is not limited thereto. For example, the relative rotation downstream end portion of the inner peripheral surface 10a of the stationary seal ring 10 may be located on the relative rotation upstream in relation to the side surface 17c of the deep groove portion 17. That is, the side surface 15c of the concave groove 15 may have a divergent shape to be inclined toward the relative rotation upstream as it goes toward the inner radial side.

Further, in the first embodiment, an embodiment in which the concave groove 15 is formed by notching the inner radial end portion of the sliding surface 11 so that a step portion having a radial step is formed by the inner peripheral surface 10a of the stationary seal ring 10 and the group of the communication portion 17A and the peripheral surface 15b has been illustrated, but the present invention is not limited thereto. For example, the communication portion of the dynamic pressure generation groove may be provided at the same radial position as the inner peripheral surface of the sliding component, a protrusion portion protruding toward the inner radial side in relation to the inner peripheral surface of the sliding component may be provided at the relative rotation upstream of the communication portion, and a step portion having a radial step may be formed by the inner peripheral surface of the protrusion portion, the communication portion, and the inner peripheral surface of the sliding component. In this case, the inner peripheral surface of the protrusion portion functions as the guide means.

Second Embodiment

Next, a sliding component according to a second embodiment of the present invention will be described with reference to FIG. 6. In addition, the description of the same configuration and the overlapping configuration with the above-described embodiment will be omitted.

Figure 6:
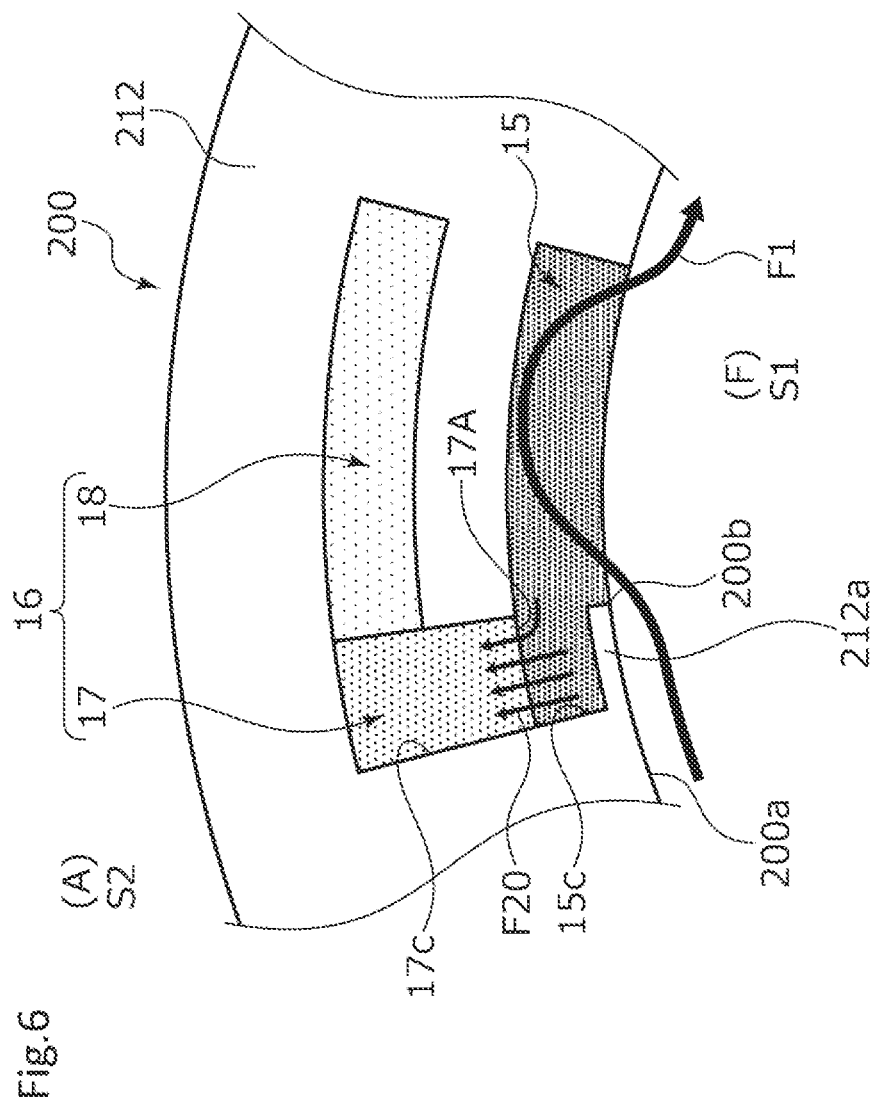
FIG. 6 is a schematic view showing a sliding component according to a second embodiment of the present invention.

As shown in FIG. 6, a relative rotation downstream end portion 200b of an inner peripheral surface 200a of a stationary seal ring 200 is located on the relative rotation downstream in relation to the side surface 17c of the deep groove portion 17. Specifically, the land 212 includes an eaves portion 212a which extends from the inner radial end portion of the side surface 15c of the concave groove 15 toward the relative rotation downstream to cover the communication portion 17A. That is, the eaves portion 212a overlaps with the communication portion 17A in the radial direction.

Accordingly, since a flow F20 of the sealing target fluid F sucked into the deep groove portion 17 is separated from the flow F1 by the eaves portion 212a, the contamination C1 flowing along the flow F1 becomes extremely difficult to follow the flow F20. Therefore, it is possible to reliably suppress the contamination C1 (see FIGS. 4 and 5) from entering the dynamic pressure generation groove 16.

Third Embodiment

Next, a sliding component according to a third embodiment of the present invention will be described with reference to FIG. 7. In addition, the description of the same configuration and the overlapping configuration with the above-described embodiment will be omitted. The sliding component of the third embodiment is a so-called bi-rotation type that can handle both clockwise and counterclockwise directions.

Figure 7:
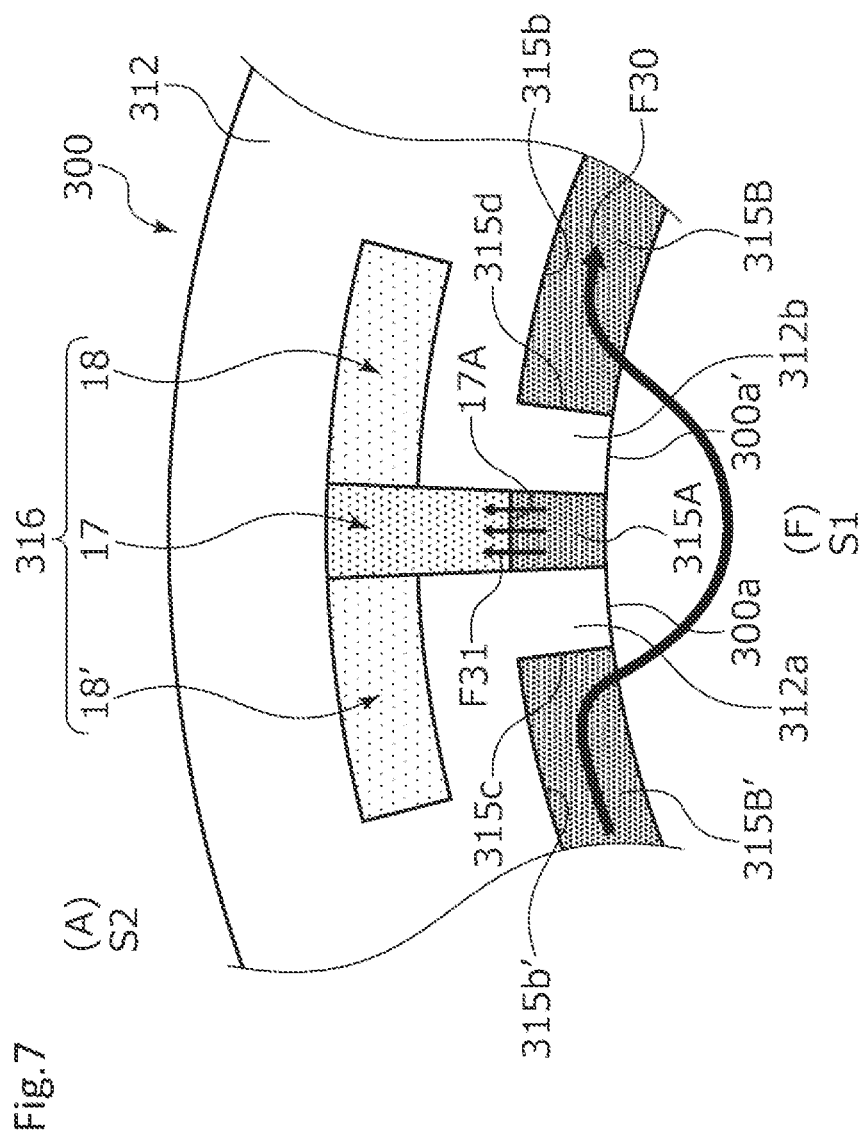
FIG. 7 is a schematic view showing a sliding component according to a third embodiment of the present invention.

As shown in FIG. 7, a stationary seal ring 300 is provided with a dynamic pressure generation groove 316 having a T shape when viewed from the axial direction and including the deep groove portion 17, the shallow groove portion 18 extending in a clockwise direction from the deep groove portion 17, and a shallow groove portion 18' extending in a counterclockwise direction from the deep groove portion 17.

Further, a concave groove 315A formed on the inner radial side of the deep groove portion 17 is notched to have the same circumferential width of the deep groove portion 17 and lands 312 remain on both sides of the concave groove 315A in the circumferential direction. Additionally, hereinafter, in the lands 312 remaining on both sides of the concave groove 315A in the circumferential direction, the counterclockwise side of the concave groove 315A in FIG. 7 is referred to as a land 312a and the clockwise side of the concave groove 315A is referred to as a land 312b.

Concave grooves 315B and 315B' which extend in the circumferential direction are respectively formed to be circumferentially adjacent to the lands 312 on both sides of the concave groove 315A in the circumferential direction. The concave grooves 315B and 315B' are partitioned by peripheral surfaces 315b and 315b' extending in the circumferential direction to have the same diameter as the communication portion 17A with the lands 312a and 312b interposed therebetween and side surfaces 315c and 315d on the side of the lands 312a and 312b in the peripheral surfaces 315b and 315b'. As will be described later, the side surfaces 315c and 315d function as the guide means.

When the rotating seal ring 20 rotates clockwise relative to the stationary seal ring 300, a positive pressure is generated in the shallow groove portion 18 and a negative pressure is generated in the shallow groove portion 18'. Since the sealing target fluid F in the vicinity of the shallow groove portion 18' can be collected by the negative pressure generated in the shallow groove portion 18', it is possible to suppress the sealing target fluid F from leaking to the outer space S2.

Further, at this time, the sealing target fluid F on the relative rotation upstream of the communication portion 17A moves along the peripheral surface 315b' of the concave groove 315B', changes the direction toward the inner radial side, that is, the inner space S1 by the side surface 315c, and becomes a flow F30 flowing toward the relative rotation downstream over the communication portion 17A. In this way, since the flow F30 is guided by the side surface 315c toward a direction different from the communication portion 17A and the peripheral surface 315b of the concave groove 315B, that is, the inner radial direction, the flow does not easily reach the communication portion 17A.

Further, since a flow F31 sucked into the communication portion 17A is substantially separated from the flow F30 in the circumferential direction by the lands 312a and 312b, the contamination C1 (see FIGS. 4 and 5) does not easily follow the flow F31.

On the other hand, when the rotating seal ring 20 rotates counterclockwise relative to the stationary seal ring 300, a positive pressure is generated in the shallow groove portion 18' and a negative pressure is generated in the shallow groove portion 18. Since the sealing target fluid F in the vicinity of the shallow groove portion 18 can be collected by the negative pressure generated in the shallow groove portion 18, it is possible to suppress the sealing target fluid F from leaking to the outer space S2.

Further, although not shown in the drawings, at this time, the sealing target fluid F on the relative rotation upstream of the communication portion 17A moves along the peripheral surface 315b of the concave groove 315B, changes the direction toward the inner radial side, that is, the inner space S1 by the side surface 315d, and becomes a flow flowing toward the relative rotation downstream over the communication portion 17A. In this way, since the flow is guided by the side surface 315d toward a direction different from the communication portion 17A and the peripheral surface 315b' of the concave groove 315B', that is, the inner radial direction, the flow does not easily reach the communication portion 17A.

Additionally, in the third embodiment, an embodiment in which the concave groove 315A is provided on the inner radial side of the deep groove portion 17 has been illustrated, but the deep groove portion 17 may extend to the inner peripheral surface 300a of the stationary seal ring 300.

Fourth Embodiment

Next, a sliding component according to a fourth embodiment of the present invention will be described with reference to FIG. 8. In addition, the description of the same configuration and the overlapping configuration with the above-described embodiment will be omitted. In addition, here, for convenience of description, the amount of the contamination C1 contained in the sealing target fluid F is shown to be larger than the actual amount.

Figure 8:
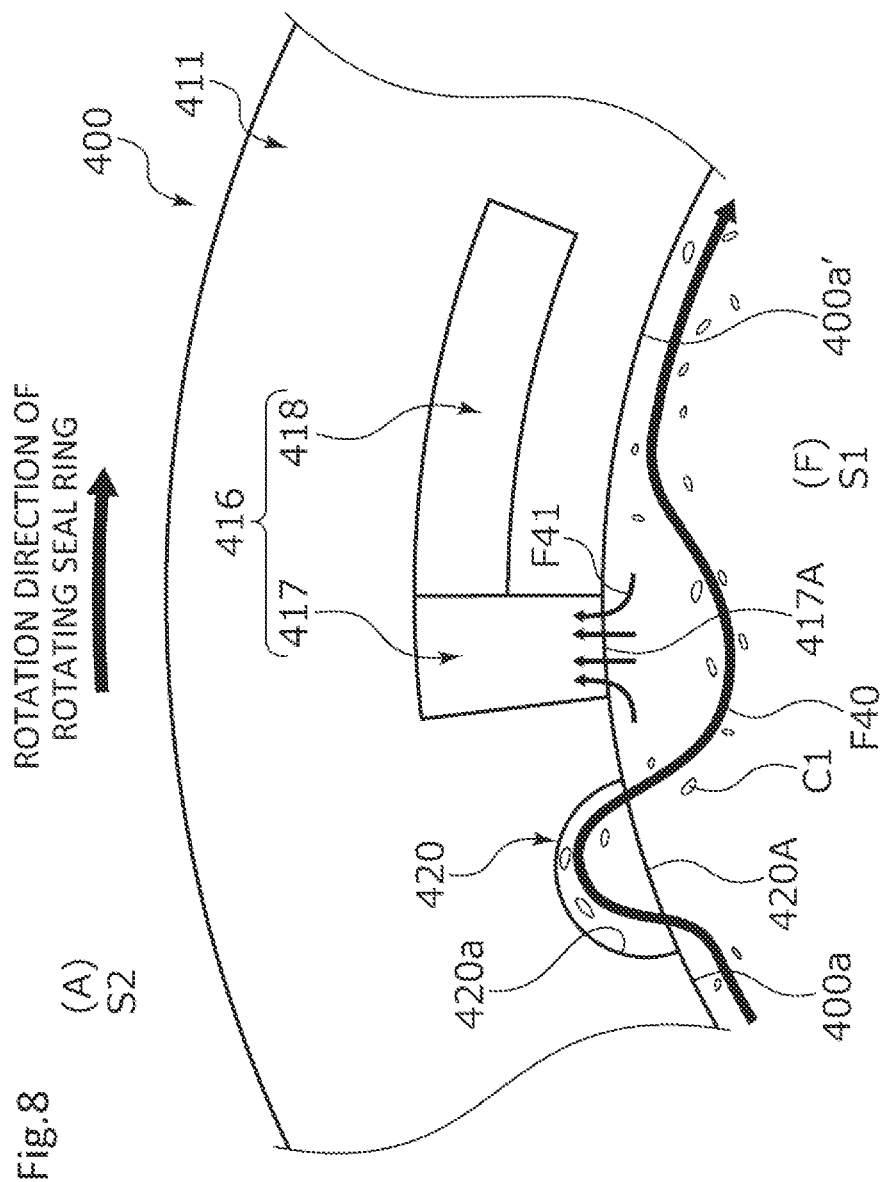
FIG. 8 is a schematic view showing a sliding component according to a fourth embodiment of the present invention.

As shown in FIG. 8, a sliding surface 411 of a stationary seal ring 400 is provided with a dynamic pressure generation groove 416 including a deep groove portion 417 and a shallow groove portion 418 and having an L shape when viewed from the axial direction and a concave portion 420 separated toward the relative rotation upstream of the deep groove portion 417 and functioning as guide means. In addition, the separation width between the deep groove portion 417 and the concave portion 420 can be freely changed.

A communication portion 417A of the deep groove portion 417 is formed to have the same diameter as an inner peripheral surface 400a of the stationary seal ring 400 and communicates with the inner space S1.

The concave portion 420 is formed in a semi-circular shape when viewed from the axial direction and includes a communication portion 420A communicating with the inner space S1. That is, a side wall 420a of the concave portion 420 is formed as a curved surface having a semi-circular shape when viewed from the axial direction. Further, the communication portion 420A is formed along the inner peripheral surface 400a of the stationary seal ring 400.

When the rotating seal ring 20 and the stationary seal ring 400 rotate relative to each other, a flow F40 of the sealing target fluid F flowing from the inner peripheral surface 400a on the relative rotation upstream of the concave portion 420 toward the relative rotation downstream through the concave portion 420 and a flow F41 of the sealing target fluid F sucked from the vicinity of the communication portion 417A into the communication portion 417A are generated in the vicinity of the sliding surfaces 411 and 21. This flow F40 becomes faster than the flow F41.

The flow F40 moves along the side wall 420a of the concave portion 420, changes the direction from the relative rotation downstream end portion of the side wall 420a toward the inner radial side, that is, the inner space S1, reaches an inner peripheral surface 400a' corresponding to the peripheral surface extending toward the relative rotation downstream of the communication portion 417A over the communication portion 417A, and flows toward the relative rotation downstream.

Since the contamination C1 having a large specific gravity contained in the sealing target fluid F flows along the flow F40 having a relative high flow velocity, most of the contamination C1 flows toward the inner peripheral surface 400a' on the relative rotation downstream of the communication portion 417A and does not easily reach the communication portion 417A. That is, the contamination C1 having a large specific gravity does not easily enter the dynamic pressure generation groove 416.

In this way, since the sealing target fluid F can be guided toward a direction different from the communication portion 417A and the inner peripheral surface 400a' using the concave portion 420, the guide means can have a simple structure.

Further, since the side wall 420a of the concave portion 420 is formed as a curved surface when viewed from the axial direction, the sealing target fluid F in the concave portion 420 can be smoothly guided along the side wall 420a.

Fifth Embodiment

Next, a sliding component according to a fifth embodiment of the present invention will be described with reference to FIG. 9. In addition, the description of the same configuration and the overlapping configuration with the above-described embodiment will be omitted. In addition, here, for convenience of description, the amount of contamination C1 contained in the sealing target fluid F is shown to be larger than the actual amount.

Figure 9:
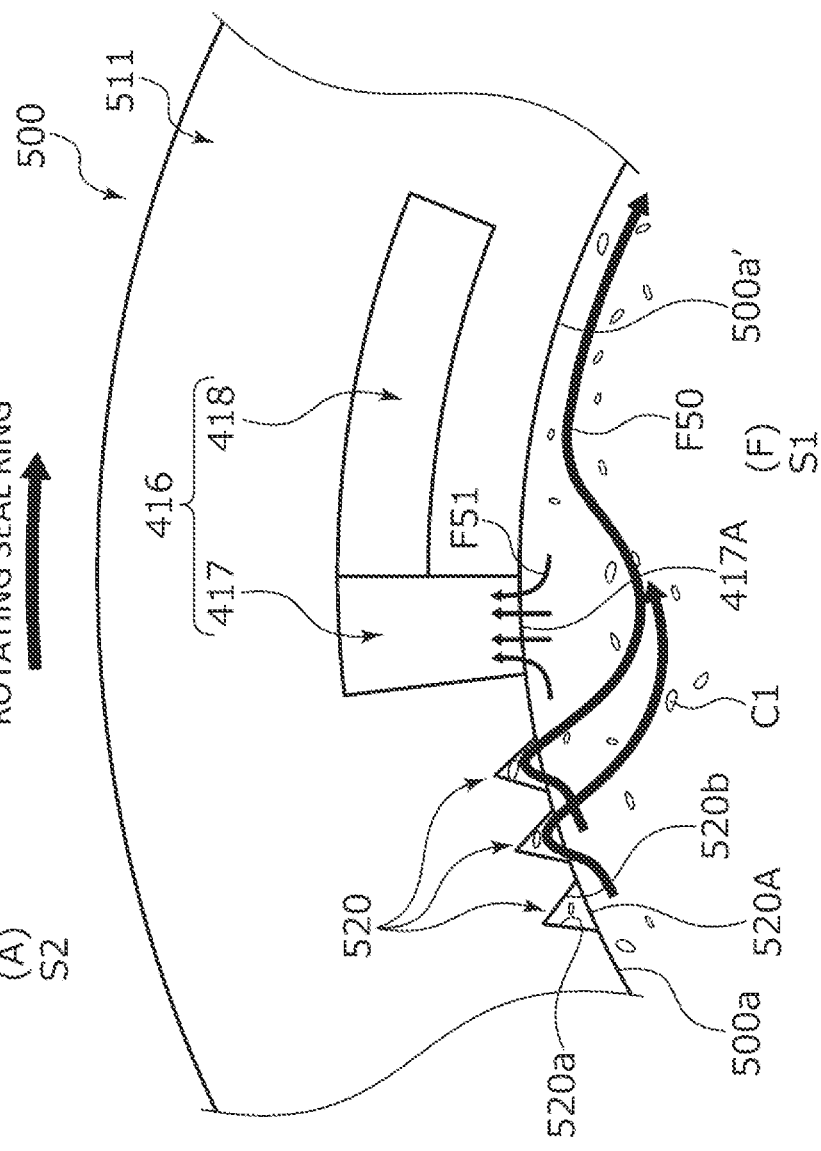
FIG. 9 is a schematic view showing a sliding component according to a fifth embodiment of the present invention.

As shown in FIG. 9, a sliding surface 511 of a stationary seal ring 500 is provided with the dynamic pressure generation groove 416 which is the same as that of the fourth embodiment and a plurality of concave portions 520 which function as guide means separated toward the relative rotation upstream of the deep groove portion 417. In addition, the separation width between the deep groove portion 417 and the concave portion 520 and the separation width between the concave portions 520 can be freely changed.

The concave portion 520 is formed in a triangular shape when viewed from the axial direction and includes a communication portion 520A communicating with the inner space S1.

Specifically, the concave portion 520 includes a first side wall 520a which extends in the outer radial direction while being inclined toward the relative rotation downstream from an inner peripheral surface 500a of the stationary seal ring 500 and a second side wall 520b corresponding to an inclined surface extending in the inner radial direction while being inclined toward the relative rotation downstream from the outer radial end portion of the first side wall 520a.

When the rotating seal ring 20 and the stationary seal ring 500 rotate relative to each other, a flow F50 of the sealing target fluid F flowing from the inner peripheral surface 500a on the relative rotation upstream of the concave portion 520 toward the relative rotation downstream through each concave portion 520 and a flow F51 of the sealing target fluid F sucked from the vicinity of the communication portion 417A into the communication portion 417A are generated in the vicinity of the sliding surfaces 511 and 21. This flow F50 becomes faster than the flow F51.

The flow F50 moves along the second side wall 520b of the concave portion 520, changes the direction from the relative rotation downstream end portion of the second side wall 520b toward the inner radial side, that is, the inner space S1, reaches an inner peripheral surface 500a' corresponding to the peripheral surface extending toward the relative rotation downstream of the communication portion 417A over the communication portion 417A, and flows toward the relative rotation downstream.

Since the contamination C1 having a large specific gravity contained in the sealing target fluid F flows along the flow F50 having a relatively high flow velocity, most of the contamination C1 flows toward the inner peripheral surface 500a' on the relative rotation downstream of the communication portion 417A and does not easily reach the communication portion 417A. That is, the contamination C1 having a large specific gravity does not easily enter the dynamic pressure generation groove 416.

Since the second side wall 520b of the concave portion 520 is formed as the inclined surface in which the inner radial end portion is located on the relative rotation downstream side in relation to the outer radial end portion of the second side wall 520b, the sealing target fluid F in the concave portion 520 can be smoothly guided along the second side wall 520b.

In addition, the guide means may be an inclined surface forming a curved surface in which the second side wall 520b protrudes toward the outer radial side instead of the concave portion 520.

Sixth Embodiment

Next, a sliding component according to a sixth embodiment of the present invention will be described with reference to FIG. 10. In addition, the description of the same configuration and the overlapping configuration with the above-described embodiment will be omitted.

Figure 10:
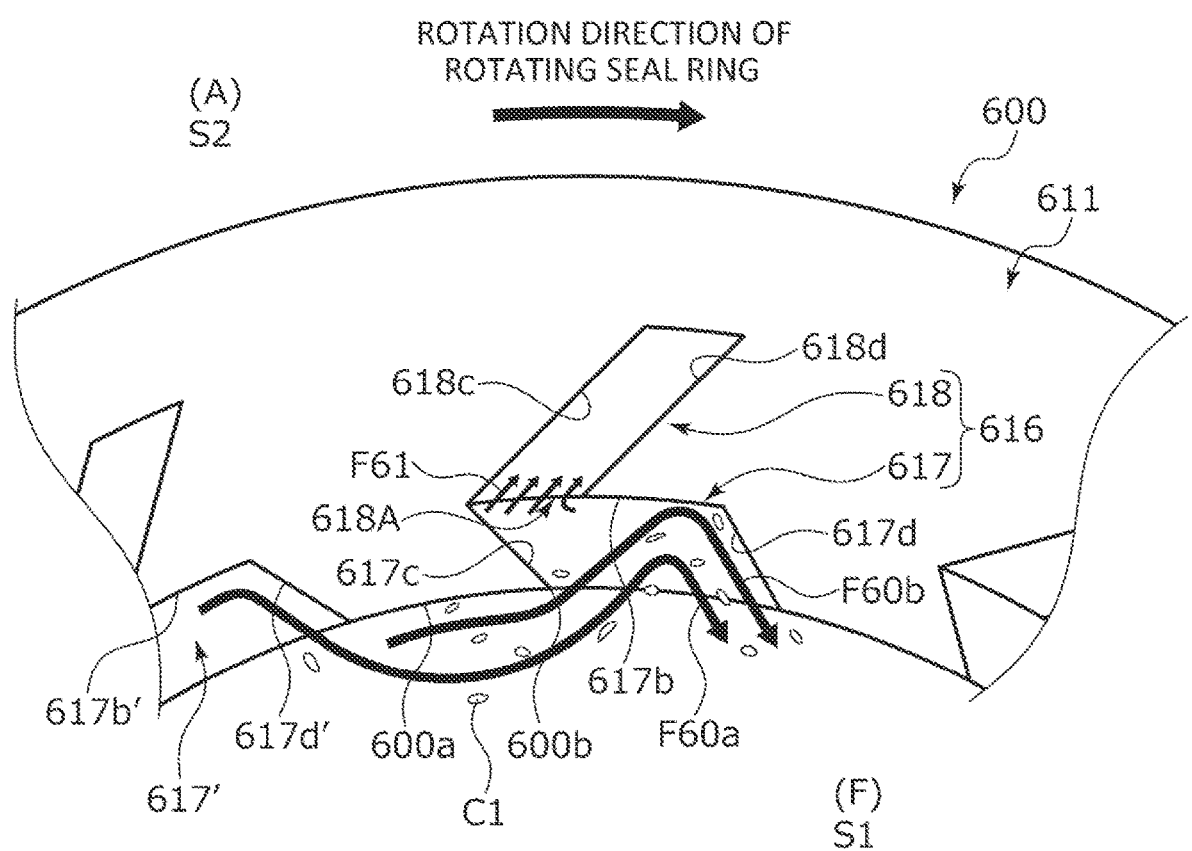
FIG. 10 is a schematic view showing a sliding component according to a sixth embodiment of the present invention.

As shown in FIG. 10, a sliding surface 611 of a stationary seal ring 600 is provided with a dynamic pressure generation groove 616 including a deep groove portion 617 and a shallow groove portion 618. The deep groove portion 617 communicates with the inner space S1 and extends in the circumferential direction and a wall portion 617c and a wall portion 617d of the deep groove portion 617 extend substantially in parallel to each other to be inclined toward the relative rotation upstream from the inner radial end toward the outer radial end. In addition, as will be described later, the wall portion 617d and an inner peripheral surface 600a of the stationary seal ring 600 function as guide means.

Further, the shallow groove portion 618 extends in the outer radial direction from the relative rotation upstream end portion of the deep groove portion 617. Specifically, a wall portion 618c and a wall portion 618d of the shallow groove portion 618 extend in parallel to be inclined toward the relative rotation downstream from the inner radial end to the outer radial end. In addition, a starting end portion 618A of the shallow groove portion 618 functions as a communication portion communicating with the inner space S1 through the deep groove portion 617.

When the rotating seal ring 20 rotates relative to the stationary seal ring 600, the sealing target fluid F in a deep groove portion 617' adjacent to the relative rotation upstream of the arbitrary deep groove portion 617 moves along a peripheral surface 617b' of the deep groove portion 617', changes the direction toward the inner radial side, that is, the inner space S1 by the wall portion 617d', and becomes a flow F60a flowing toward the relative rotation downstream, that is, the peripheral surface 617b over the starting end portion 618A.

Further, the sealing target fluid F flowing along the inner peripheral surface 600a of the stationary seal ring 600 on the relative rotation upstream of the starting end portion 618A becomes a flow F60b flowing in a meandering manner in the outer radial direction at a certain position of the deep groove portion 617 over the starting end portion 618A. These flows F60a and F60b are faster than the flow F61.

In this way, since the contamination C1 having a large specific gravity contained in the sealing target fluid F flows along the flows F60a and F60b having a relatively high flow velocity, most of the contamination C1 flows toward the peripheral surface 617b on the relative rotation downstream of the starting end portion 618A and does not easily reach the starting end portion 618A.

Further, since a relative rotation downstream end portion 600b of the inner peripheral surface 600a of the stationary seal ring 600 is located on the relative rotation downstream in relation to the inner radial end of the wall portion 618c of the shallow groove portion 618 and the flows F60a and F60b are separated from the flow F61, the contamination C1 flowing along the flows F60a and F60b become extremely difficult to follow the flow F61.

Although the embodiments of the present invention have been described with reference to the drawings, the specific configuration is not limited to these embodiments and is included in the present invention even if there are changes or additions within the scope of the present invention.

For example, in the above-described embodiments, the dynamic pressure generation groove including the deep groove portion having the communication portion with the inner space and the shallow groove portion having the blocking portion has been described as an example, but the dynamic pressure generation groove may include the communication portion and the blocking portion. For example, the dynamic pressure generation groove may be a spiral groove or the like having a constant depth in the longitudinal direction while being inclined in the circumferential direction and extending in the radial direction.

Further, an embodiment in which the blocking portion of the dynamic pressure generation groove is the wall portion orthogonal to the extension direction of the shallow groove portion has been illustrated, but the blocking portion of the dynamic pressure generation groove may be configured to generate a dynamic pressure. For example, the relative rotation downstream end portion of the dynamic pressure generation groove may be formed so that the cross-sectional area gradually decreases toward the extension direction.

Further, the sealing target fluid has been described as the high-pressure liquid, but the present invention is not limited thereto. For example, the sealing target fluid may be a gas or a low-pressure liquid or may be a mist in which a liquid and a gas are mixed.

Further, the leakage-side fluid has been described as the atmosphere corresponding to the low-pressure gas, but the present invention is not limited thereto. For example, the leakage-side fluid may be a liquid or a high-pressure gas or may be a mist in which a liquid and a gas are mixed.

Further, the sealing target fluid side has been described as the high pressure side and the leakage side has been described as the low pressure side. However, the sealing target fluid side may be the low pressure side, the leakage side may be the high pressure side, and the sealing target fluid side and the leakage side may have substantially the same pressure.

Further, an embodiment of the outside type that seals the sealing target fluid F tending to leak from the inner radial side toward the outer radial side of the sliding surface has been illustrated, but the present invention is not limited thereto. For example, an inside type that seals the sealing target fluid F tending to leak from the outer radial side toward the inner radial side of the sliding surface may be used.

Further, as the sliding component, the mechanical seal for general industrial machines has been described as an example, but other mechanical seals for automobiles, water pumps, and the like may be used. Further, the present invention is not limited to the mechanical seal and may be a sliding component other than the mechanical seal such as a slide bearing.

Further, an example in which the dynamic pressure generation groove is provided in the stationary seal ring has been described, but the dynamic pressure generation groove may be provided in the rotating seal ring.

Further, an embodiment in which eight dynamic pressure generation grooves are provided in the sliding surface has been illustrated, but the number may be freely changed. Further, the shape of the dynamic pressure generation groove may be also freely changed.

As the guide means, both the concave groove and the concave portion have a bottom surface, but the present invention is not limited thereto. For example, the concave portion may be formed in the axial direction of the sliding component to be recessed in the radial direction. In other words, the concave portion may not include the bottom surface.

REFERENCE SIGNS LIST

10 Stationary seal ring (sliding component)
10a Inner peripheral surface (guide means, peripheral surface portion)
11 Sliding surface
12 Land
15 Concave groove
15a Bottom surface (inclined surface)
15b Peripheral surface (peripheral surface)
16 Dynamic pressure generation groove
17A Communication portion
18B Terminating end portion (blocking portion)
20 Rotating seal ring (other sliding component)
21 Sliding surface
200 Stationary seal ring (sliding component)
200a Inner peripheral surface (guide means)
212a Eaves portion
300 Stationary seal ring (sliding component)
315b, 315b' Peripheral surface
315c, 315d Side surface
316 Dynamic pressure generation groove
400 Stationary seal ring (sliding component)
400a' Inner peripheral surface (peripheral surface)
416 Dynamic pressure generation groove
420 Concave portion (guide means)
420a Side wall
500 Stationary seal ring (sliding component)
500a' Inner peripheral surface (peripheral surface)
520 Concave portion (guide means)
520b Second side wall
A Atmosphere
C1 Contamination
F Sealing target fluid
S1 Inner space (external space)
S2 Outer space (external space)

The invention claimed is:

1. A pair of sliding components formed in an annular shape, disposed at a relatively rotating position of a rotating machine in use and having sliding surfaces which slides relative to each other in use,
wherein the sliding surface of at least one of the sliding component is provided with a plurality of concave grooves arranged independently of each other in a circumferential direction and each having a first end portion and a second end portion which are opposed to each other in a circumferential direction and which are isolated from each other by at least a land defining the sliding surface in a circumferential region where the concave groove does not exist, the first end portion of each of the concave grooves being disposed on an upstream side of a relative rotation of the sliding components, the second end portion of each of the concave grooves being disposed on a downstream side of the relative rotation of the sliding components, wherein the sliding surface of at least one of the sliding components is further provided with a plurality of dynamic pressure generation grooves which are arranged independently of each other in the circumferential direction and each of which has a smaller depth than each of the concave grooves, each of the dynamic pressure generation grooves including a communication portion which communicates with each of the concave grooves, wherein the dynamic pressure generation groove further includes a dead-end portion extending from the communication portion toward the downstream side of the relative rotation of the sliding components in the circumferential direction and closed at a terminal end thereof, wherein at least the second end portion of each of the concave grooves opens at one of an inner peripheral surface and an outer peripheral surface of the one of the sliding components, and wherein the land includes an eaves portion which extends in the one of the inner peripheral surface and the outer peripheral surface of the one of the sliding components such that the first end portion of the concave groove does not open at the one of the inner peripheral surface and the outer peripheral surface throughout a circumferential length of the communication portion of the dynamic pressure generation groove.

2. The pair of sliding components according to claim 1, wherein the concave groove has an inclined bottom surface which is inclined to be deeper from the communication portion toward the one of the inner peripheral surface and the outer peripheral surface of the one of the sliding components.

3. The pair of sliding components according to claim 1, wherein the concave groove has an inclined bottom surface which is inclined to be deeper from the communication portion toward the one of the inner peripheral surface and the outer peripheral surface of the one of the sliding components.

\* \* \* \* \*